United States Patent [19]

Scicluna

[11] Patent Number: 5,140,816
[45] Date of Patent: Aug. 25, 1992

[54] INTERNAL COMBUSTION ENGINE TURBO CHARGER

[75] Inventor: Paul J. Scicluna, Kingswood Via Penrith, Australia

[73] Assignee: Natli Enterprises Pty, Ltd., Kingsford, Australia

[21] Appl. No.: 476,976

[22] Filed: Feb. 7, 1990

[30] Foreign Application Priority Data

May 19, 1989 [AU] Australia .................. PJ4308

[51] Int. Cl.⁵ .................. F02B 33/00; F02B 33/44
[52] U.S. Cl. .................. 60/605.1; 123/559.1
[58] Field of Search .................. 60/605.1, 611; 123/559.1, 564

[56] References Cited

U.S. PATENT DOCUMENTS

| | | | |
|---|---|---|---|
| 1,995,935 | 3/1935 | Marks et al. | 123/559.1 |
| 3,568,435 | 3/1971 | May | 123/564 |
| 4,558,680 | 12/1985 | Nakazato | 123/559.1 |
| 4,760,703 | 8/1988 | Minami et al. | |
| 4,791,906 | 12/1988 | Egomard | 123/564 |

Primary Examiner—Richard A. Bertsch
Assistant Examiner—Alfred Basichas

[57] ABSTRACT

A turbo charging assembly particularly suited to motorcycles and requiring litle modification of a normally aspired engine for fitment. The assembly includes a turbine/compressor unit (1 and 2) and a narrow plenum chamber (4) leading to the inlet of a carburettor (5) in the standard carburettor position. The carburettor is not particularly adapted for super charged aspiration but is of conventional design. The plenum chamber (4) includes an air dump valve (8) opened by high intake vacuum such as occurs during engine overrun. The air filter (11) is attached directly to the compressor (1) inlet.

5 Claims, 2 Drawing Sheets

INTERNAL COMBUSTION ENGINE TURBO CHARGER

BACKGROUND OF THE INVENTION

This invention relates to gas turbine driven superchargers, commonly called turbo chargers, for internal combustion engines and is particularly well adapted for use on motor cycles.

It is well known in the prior art to increase the volume of an air induction charge in an internal combustion engine by providing a compressed air supply to the engine rather than induction directly from the atmosphere. Where the engine is provided with combustible fuel via a carburettor mixing the fuel with the induction air volume, the carburettor must include a petrol reservoir which supplies petrol to the carburettor jets. The petrol reservoir, or float bowl, is traditionally maintained at atmospheric pressure so that the carburettor may accurately proportion the fuel air mixture by virtue of the static pressure difference at the carburettor venturi compared with the fuel reservoir. For this reason carburettor supercharged (including turbo charger) induction systems traditionally placed the carburettor at the atmospheric end before the air compressor.

There have been proposals, such as U.S. Pat. Nos. 4760703 and 4822532 whereby for various reasons turbo charger compressors have been placed before the carburettor in the induction system. In U.S. Pat. No. 4760703 a large volume plenum chamber and adjacent air filter box with inter-connecting bypass valve connects directly to the carburettor intakes. A pair of air lines run to and from the air box and plenum chamber via the turbo compressor, the lines for the sake of efficiency being necessarily of large diameter and therefore on a motor cycle difficult to route without re-arranging other cycle components. U.S. Pat. No. 4822532 includes a turbo charger supplying pressured air to a specialised carburettor which has been developed specifically to overcome problems associated with excessive boost and would not usually be used on a naturally aspired engine.

OBJECT OF THE INVENTION

The present invention sets out to provide a turbo charger kit that can be directly attached to an otherwise normally aspired engine without substantial alteration from its standard factory production state, or can be used in a factory production vehicle without necessitating substantial change in the vehicle production procedure and its components.

SUMMARY OF THE INVENTION

Accordingly, in one broad aspect, the present invention provides a turbo charging induction system for a carburettor equipped internal combustion engine comprising:

a power turbine adapted to be installed in the engine exhaust system;

an air compressor driven by the turbine;

an air conduit with compressor and carburettor end attachments adapted to sealingly attach to the compressor outlet and carburettor inlet respectively and being a length to extend from proximate the carburettor mouth location to the compressor location in the exhaust route;

and a pressured air connection extending from the conduit for attachment to the carburettor fuel bowl interior so that during operation the fuel bowl is pressured at approximately the pressure delivered by the compressor to the carburettor mouth.

In one aspect of the invention the conduit includes a dump valve actuated by high vacuum in the inlet port to dump pressured air in the conduit to the atmosphere.

The invention preferably provides that the conduit is in the form of an elongate rectangular sectional plenum chamber sized and shaped to fit neatly against the engine to which the system is to be attached. The volume is sufficient to dampen out any pressure pulses that might otherwise occur and to act as a pressured air reservoir to compensate for induction lag when the carburettor throttle is quickly opened.

The invention thus provides the air compressor before the conventional carburettor and includes a fuel bowl pressure compensation but the layout of the main cycle components need not be changed.

BRIEF DESCRIPTION OF THE DRAWINGS

By way of example only, a preferred embodiment of the invention will now be described with reference to the drawings in which.

DESCRIPTION OF A PREFERRED EMBODIMENT

Figure 1:
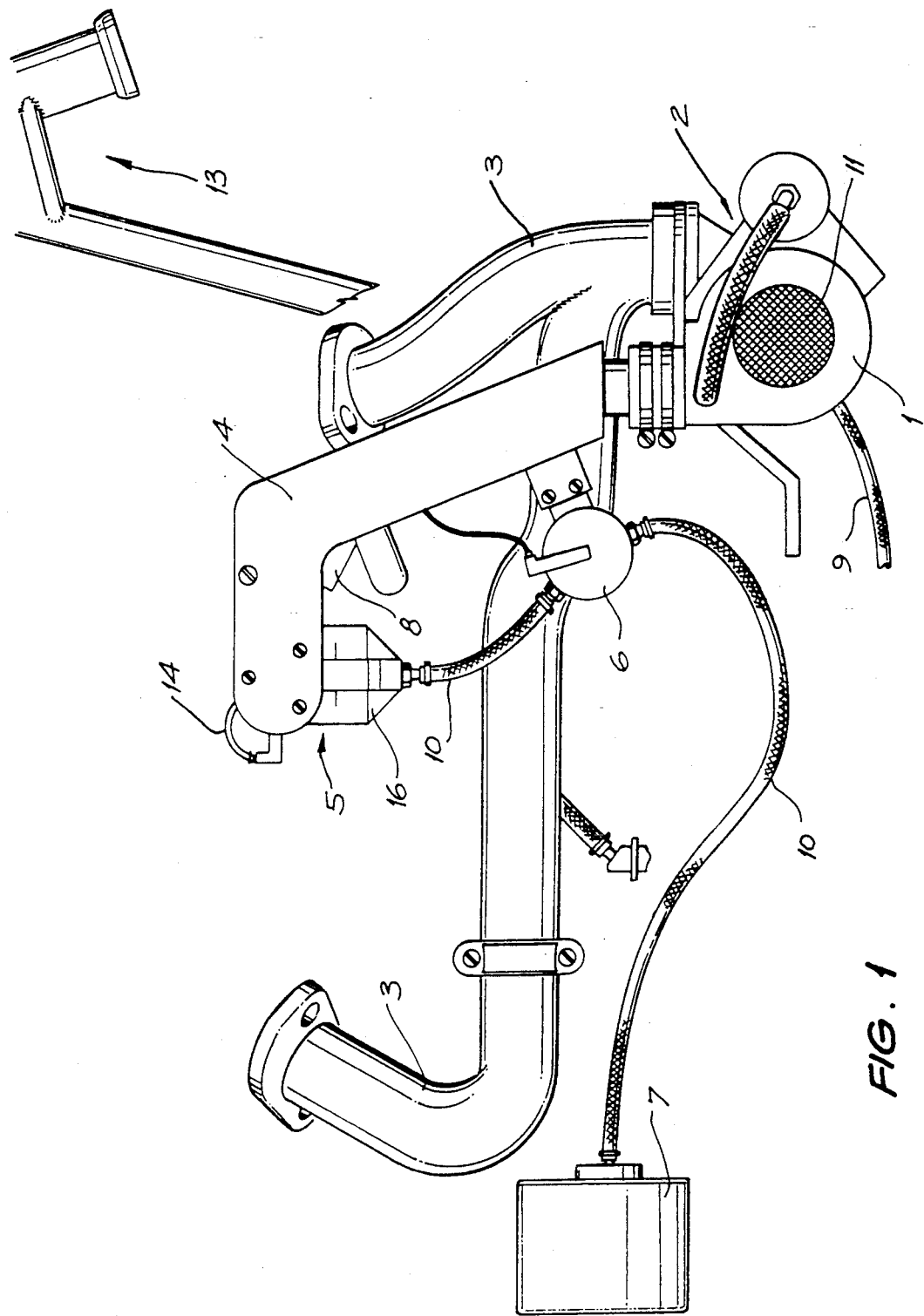
FIG. 1 is a side elevation sketch of an induction system according to the invention.
Figure 2:
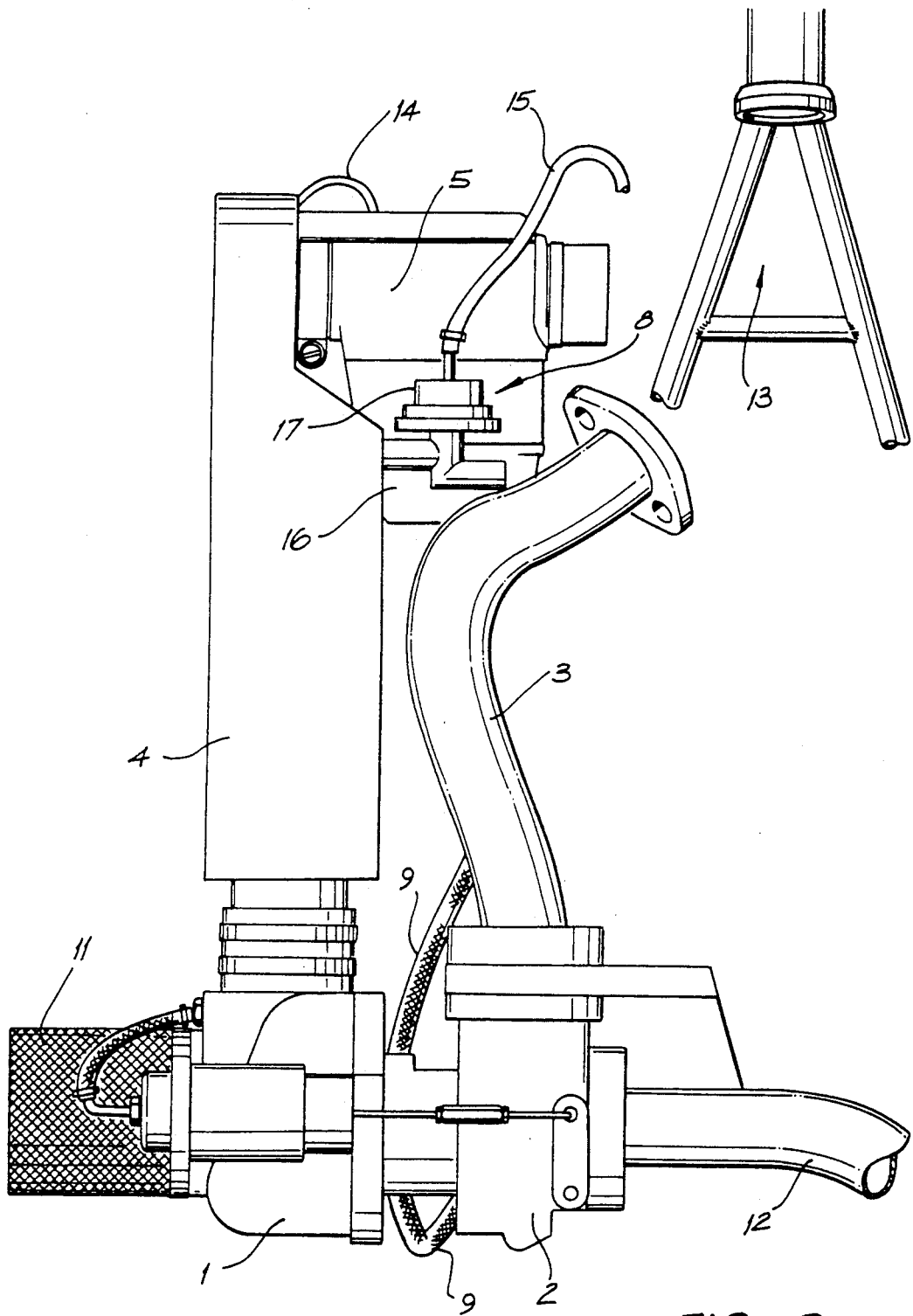
FIG. 2 is a front elevation sketch of the induction system of FIG. 1.

The major functional components of the induction system are the compressor 1, the carburettor 5, the pressured air duct 4 leading from the compressed air outlet of the compressor 1 to the inlet mouth of the carburettor 5, and the power turbine 2 which extracts power from the engine exhaust gas to drive the rotary fan of the compressor 1.

The exemplary embodiment of the induction system is designed to suit a Harley Davidson motor cycle wherein the carburettor 5 is positioned in the standard carburettor position for that vehicle, i.e. between the cylinders and to one side. The turbo unit comprising the power turbine 2 and compressor 1, is conveniently positioned low down in front of the engine somewhat below the gooseneck or steering head 13. Header pipes 3 from the kit feed the exhaust gas from the engine to the power turbine 2 where energy is extracted from the gas by an expansion process and exhausted through the exhaust pipe 12 which extends initially transversely across the front of the engine.

The carburettor 5 is a replacement, conventional carburettor, the standard unit having a diaphragm type accelerator pump that may be damagedly boost pressure. An aftermarket S & S brand "B Super" model carburettor is used but other suitably tuned items will also suit.

The power is transferred from the power turbine 2 to the compressor 1 by a rigid shaft in the conventional manner.

The compressor 2 draws air transversely through the air filter 11 which can be conveniently attached directly to the compressor inlet and delivers it at increased pressure to the interior of the pressured air duct 4. The duct 4 lies alongside the right of the engine and directs the air to the inlet mouth of the carburettor 5. The duct is of a rectangular cross section providing sufficient internal volume to dampen air pressure pulses and offer minimum resistance to air flow but to still sit snugly against the engine and without necessitating changes to the frame or other components of the standard bike. The duct is large enough to act as a plenum chamber to smooth out the air demand of the engine.

In the back of the air duct 4, proximate the inlet mouth of the carburettor 5, an air bleed line 14 leads to the top of the carburettor float bowl via the normal atmospheric vent. The float bowl is otherwise blocked off from the atmosphere so that during operation the petrol in the float bowl is not exposed to atmospheric pressure but instead to the above atmospheric pressure delivered to the carburettor mouth to currently meter the fuel/air mixture.

A dump valve 8 is connected via a vacuum line to an inlet manifold of the engine and dumps excess pressure from the air duct 4 during high inlets vacuums, e.g., on overrun, otherwise, where delivery from the compressor 2 is high but demand by the engine low, excessive pressure may develop in the duct 4 and carburettor 5. The dump valve 8 can be a diaphram valve with the low pressure control side connected to the vacuum line 15.

Petrol is delivered to the carburettor 5 via a convenient fuel system including a fuel pump 7, fuel lines 10, and a fuel regulator 6. The petrol is delivered under pressure to ensure its free flow into the pressurised fuel bowl of the carburettor rather than rely solely on the standard gravity feed which might not effectively open the needle valve in the float bowl when boost pressure is high.

The turbo unit is lubricated from the engine lubrication system via oil lines 9 in a conventional manner.

Thus, when compared to a conventional standard engine, the carburettor can be a conventional unit and need not be repositioned. The turbo unit and exhaust system are positioned to give good access to cycle components and to maintain the lowest possible centre of gravity without necessitating a long and complicated air induction passage the re-routing of carburettor controls, or the repositioning of major cycle components.

Thus, in this case a Harley Davidson motor cycle, can be converted from a factory standard normally aspired engine into a turbo charger boosted engine with a relatively simple kit which involves no extensive re-engineering or design changes in any parts of the bike and utilises to a very large degree all existing components and requires only a conventional carburettor. Exhaust header pipes which are relatively cheap items, must be included in the kit to suit the location of the turbo charger and some additional petrol lines are required in order to feed fuel to the carburettor via the petrol pump rather than the simple gravity method on the standard machine, otherwise there is virtually no change in standard vehicle components, only the addition of the kit components.

As the kit makes very few of the standard bike components redundant and uses an inexpensive conventional carburettor, the material cost is kept to a minimum and, as the fitting of the kit is straightforward there is little labour cost in the transformation.

Also because the kit requires very little alteration from the standard production vehicle, it is suited to relatively low production run vehicles, or at least production vehicles where there is perceived to be only a small demand for a turbo charged variant of the basic vehicle, without making the production cost of the turbo charged variant significantly higher than the standard bike.

The arrangement of components in the above described exemplary embodiment including the long relatively large volume air duct, dump valve for preventing excess pressure buildup, and air bleed line to pressurise the carburettor float bowl, this unit provides significant performance improvement over a naturally aspired version safely and with simple installation and minimum cost.

I claim:

1. A turbo charging induction system for a carburetor equipped internal combustion engine comprising:
   a power turbine adapted to be installed in the engine exhaust system without the need to substantially re-route the exhaust;
   an air compressor driven by the turbine;
   an air conduit plenum chamber with compressor and carburetor end attachments adapted to be sealingly attached to the compressor outlet and carburetor inlet respectively and being a length to extend from the carburetor mouth location to the compressor location in the exhaust route, said plenum chamber sized so as to provide induction pressure pulsed damping at least at the carburetor inlet;
   a pressured air connection extending from the conduit for attachment to the carburetor fuel bowl interior so that during operation the fuel bowl is pressured at approximately the pressure delivered by the compressor to the carburetor mouth; and
   a dump valve connected to the conduit and having a vacuum sensor connected by an air control line to an inlet manifold of the engine, the dump valve being actuated only by high inlet vacuum in the inlet port to dump pressured air in the conduit to the atmosphere.

2. The induction system of claim 1 where the conduit is a substantially elongate rectangular sectioned chamber shaped to fit snugly alongside the engine to which the system is to be installed and sized so as to provide induction pressure pulse damping at least at the carburettor inlet.

3. An induction system as in claim 1 further including a carburetor equipped motor cycle including a turbo charging induction system having been installed post production wherein the carburetor is the original equipment carburetor and the turbo charging induction system includes a turbo unit with combined power turbine and air compressor located approximate the front of the engine at a low level being driven by engine exhaust gas, an elongate rectangular sectioned air conduit plenum chamber leading from the compressor along the side of the motor to the carburetor and being sealingly attached to the inlet mouth of the carburetor, and air bleed line leading from the interior of the air conduit to the carburetor float bowl so as to pressurise the chamber of the carburetor float bowl to substantially the same pressure as the air in the conduit during motor operation, and an air dump valve in a wall of the air conduit with a control air line leading from a vacuum sensor of the dump valve to at least one inlet port on the engine side of the carburetor so as to effect the opening of the valve and dumping of pressured air within the conduit only when high vacuum is sensed in the inlet port.

4. An induction system as in claim 1 further including a turbo charging induction system equipped motor cycle with carburetor aspiration, the motor components and layout being substantially the same as a naturally aspirated version of that motor cycle produced by the same manufacturer excepting the inclusion of the turbo charging induction system comprising:

a power turbine driven by the engine exhaust system, an air compressor driven by the turbine, an air conduit plenum chamber delivering pressured air from the air compressor to the carburetor being substantially elongate and generally rectangular in cross section so as to lie close to and alongside the motor, a dump valve controllably opening the interior of the air conduit to the atmospheric exterior in response to high vacuum sensed by the dump valve in the engine inlet between a combustion chamber and the carburetor, and an air bleed line pressurising the carburetor float bowl form the interior of the air conduit.

5. The induction system in claim 1, wherein the damp valve is preadjusted to open only when high vacuum is sensed on the inlet port.

* * * * *